H. SHUTTLEWORTH.
HARVESTING MACHINE.
APPLICATION FILED APR. 23, 1915.
1,233,134.
Patented July 10, 1917.
3 SHEETS—SHEET 2.
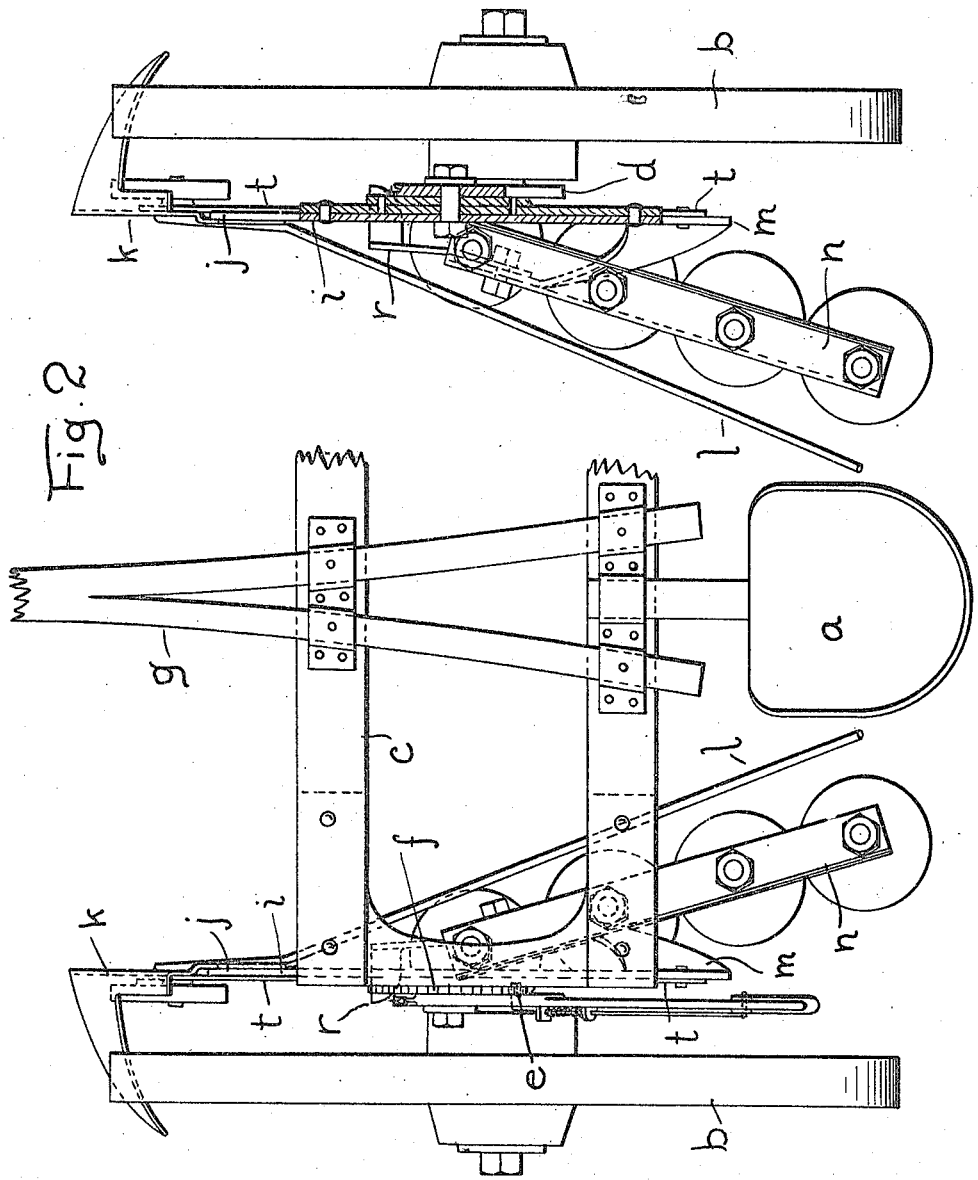
INVENTOR
Harry Shuttleworth
BY
Ralzemond A. Parker
ATTORNEY

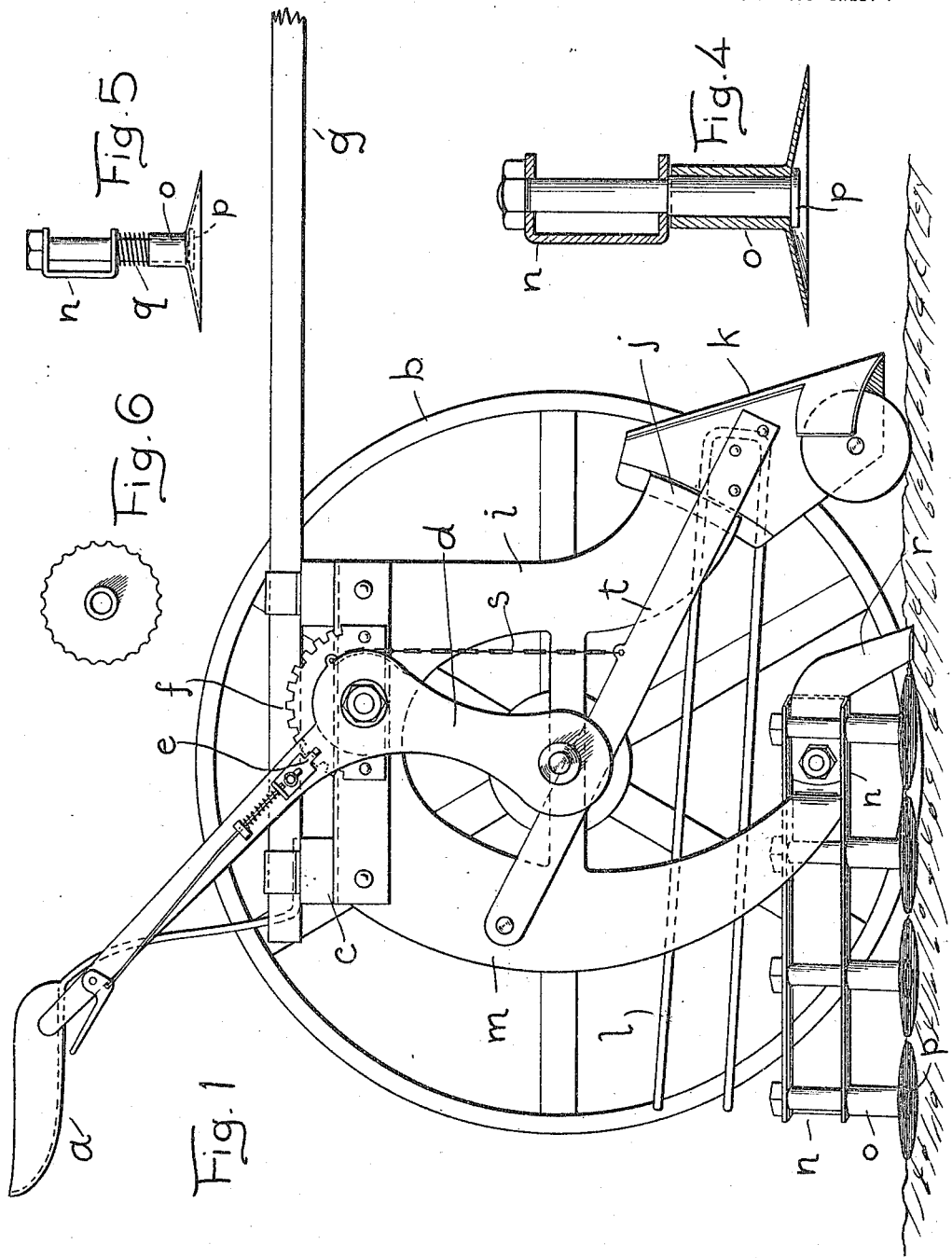

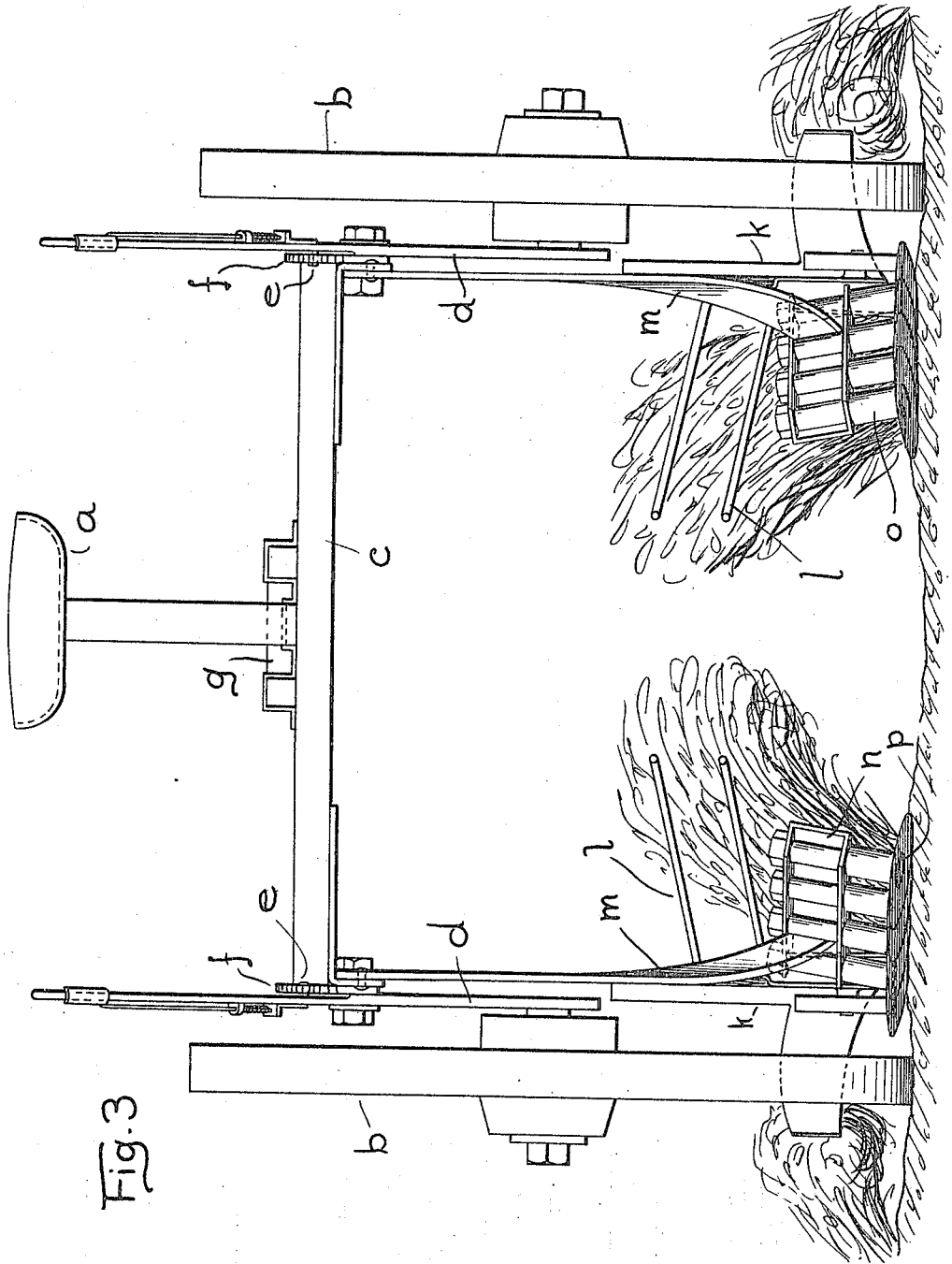

UNITED STATES PATENT OFFICE.

HARRY SHUTTLEWORTH, OF FLINT, MICHIGAN, ASSIGNOR OF ONE-HALF TO FARLEY & SELBY, A COPARTNERSHIP COMPOSED OF JOHN H. FARLEY AND GUY W. SELBY, OF FLINT, MICHIGAN.

HARVESTING-MACHINE.

1,233,134.  Specification of Letters Patent.  Patented July 10, 1917.

Application filed April 23, 1915. Serial No. 23,383.

*To all whom it may concern:*

Be it known that I, HARRY SHUTTLEWORTH, a citizen of the United States, residing at Flint, county of Genesee, State of Michigan, have invented a certain new and useful Improvement in Harvesting-Machines, and declare the following to be a full, clear, and exact description of the same, such as will enable others skilled in the art to which it pertains to make and use the same, reference being had to the accompanying drawings, which form a part of this specification.

This invention relates to machines for cutting bean vines or similar plants. It has for its object apparatus suitably designed to do this cutting in an efficacious way.

In the drawings,—

Figure 1 is a side elevation of the machine.

Fig. 2 is a plan view of the machine.

Fig. 3 is a rear elevation of the same.

Fig. 4 is a sectional detail of a cutter and its mounting.

Fig. 5 is a detailed elevation of a modified form of cutter and its mounting.

Fig. 6 is a plan view of one of the cutters detached from its mounting.

The machine contains a number of parts which are common in farm implements, such, for instance, as the seat $a$, and the traction wheels $b$ capable of having their relative positions with respect to the carriage $c$ changed by means of being journaled on bell crank arms $d$ which are pivoted to the carriage $c$. These bell crank arms are held in various positions of adjustment by reason of the catches $e$ engaging in the toothed segments $f$. A suitable tongue $g$ is employed.

Depending from the front of the carriage are a pair of members $i$ whose forward ends $j$ act as guides for lifting and lowering the caster carriers $k$. Each caster carrier is provided with a pair of rearwardly and obliquely extending deflecting rods $l$. The two pairs of deflecting rods converge toward each other at the rear. The purpose of these deflecting rods is to force the bean vines over to one side and away from the cutters, as shown in Fig. 3.

At the rear of the carriage a pair of hangers $m$, one at each side, each support a cutter carrier $n$ which carries a gang of rotary cutters provided with serrated edges (the latter feature appearing in Fig. 6). These cutters are each provided with a hub $o$ sleeved upon small depending shafts secured to the cutter carrier $n$, the enlarged end $p$ of the shaft serving to restrain the cutter from dropping off. In the form shown in Fig. 5 an expansion spring $q$ serves to yieldingly force the cutter downward but allows upward movement of the cutter when desirable by reason of striking an obstruction. The cutters are in the form of disks that are preferably tipped only slightly from the horizontal. The guard $r$ precedes the cutter carrier to protect and deflect obstructions.

A chain $s$ connects the link $t$, which pivots the caster carrier $k$ to the hanger $m$, with the bell crank arm $d$. Hence when the handle end of the bell crank lever is pulled to the rear to lower the traction wheels and thereby bring the cutters clear of the ground, which is especially desirable when the implement is traveling along the road to or from work, the caster carriage is lifted clear of the road.

The operation is as follows: The implement is preferably designed to straddle two bean rows. The traction wheels are adjusted relatively to the carriage to bring the gangs of cutters at the desired point of contact with the bean vines. The deflectors bow the plants over away from the cutters. The chosen point for cutting the bean vines may be at the very point where they enter the earth or for that matter the cutters may dig into the bean hills and cut the roots instead of the bean stems, depending of course upon the relative positions of the traction wheels and the cutters and the height of the bean hills above the ground upon which the traction wheels are traveling. The two gangs of cutters converge toward each other from front to rear so as to give considerable width to the cutting swath and at the same time deliver an oblique drawing cut which is known to be the most effective and which at the same time rotates the cutters by reason of their serrated or toothed edges.

What I claim is:

1. In a harvesting machine of the class described, the combination of a carriage, a pair of movably supported traction wheels, cutting mechanism adjustable relatively to the traction wheels, and a caster carriage and caster lifted as the traction wheels are lowered.

2. In a harvesting machine of the class described, the combination of a pair of traction wheels, a caster wheel and carriage, means for pivotally connecting the caster wheel and carriage with the first mentioned carriage, a deflector extending obliquely and rearwardly from the caster wheel carriage, cutting mechanism supported from the first mentioned carriage, and means for lowering the traction wheel with respect to the cutting mechanism and at the same time lifting the caster wheel and deflector with respect to the traction wheel and vice versa.

3. In a harvesting machine, the combination of a carriage $c$, the member $i$ with its guiding surface $j$, the caster wheel carriage $k$ provided with a caster wheel, the deflector $l$, the link $t$ pivotally supported at one end, the bell crank arm $d$, the traction wheel $b$ journaled at the end of the bell crank arm, and means for connecting the link $t$ with the bell crank arm $d$ for the purpose of raising the caster wheel and carriage as the traction wheel $b$ is lowered.

In testimony whereof, I sign this specification in the presence of two witnesses.

HARRY SHUTTLEWORTH.

Witnesses:
 CLARENCE A. CAMERON,
 GUY W. SELBY.

Copies of this patent may be obtained for five cents each, by addressing the "Commissioner of Patents, Washington, D. C."